United States Patent
Gu et al.

(10) Patent No.: US 10,438,000 B1
(45) Date of Patent: Oct. 8, 2019

(54) USING RECOGNIZED BACKUP IMAGES FOR RECOVERY AFTER A RANSOMWARE ATTACK

(71) Applicant: Symantec Corporation, Mountain View, CA (US)

(72) Inventors: Lei Gu, Bedford, MA (US); Ilya Sokolov, Boston, MA (US)

(73) Assignee: Symantec Corporation, Mountain View, CA (US)

( * ) Notice: Subject to any disclaimer, the term of this patent is extended or adjusted under 35 U.S.C. 154(b) by 195 days.

(21) Appl. No.: 15/712,940

(22) Filed: Sep. 22, 2017

(51) Int. Cl.
  *G06F 21/56* (2013.01)
  *H04L 29/06* (2006.01)

(52) U.S. Cl.
  CPC ........ *G06F 21/568* (2013.01); *H04L 63/1466* (2013.01); *G06F 2221/0782* (2013.01); *G06F 2221/2107* (2013.01)

(58) Field of Classification Search
  None
  See application file for complete search history.

(56) References Cited

U.S. PATENT DOCUMENTS

| | | | | |
|---|---|---|---|---|
| 7,979,418 B1 * | 7/2011 | Schlemmer | ........... | G06F 16/322 707/709 |
| 8,527,618 B1 * | 9/2013 | Wiese | ................... | G06F 21/575 709/223 |
| 2002/0112116 A1 * | 8/2002 | Nelson | .................. | G06F 16/284 711/103 |
| 2007/0067304 A1 * | 3/2007 | Ives | ...................... | G06F 16/951 |
| 2009/0192979 A1 * | 7/2009 | Lunde | ................. | G06F 11/1461 |
| 2010/0049565 A1 * | 2/2010 | Aebig | ................... | G06F 17/246 705/7.28 |
| 2010/0092084 A1 * | 4/2010 | Perronnin | .......... | G06K 9/00442 382/170 |
| 2010/0189354 A1 * | 7/2010 | de Campos | ........ | G06K 9/00597 382/190 |
| 2011/0060895 A1 * | 3/2011 | Solomon | ................... | G06F 8/36 713/1 |

(Continued)

OTHER PUBLICATIONS

"Deep Dream", Wikipedia, https://en.wikipedia.org/w/index.php?title=DeepDream&oldid=798075181, Revised Aug. 2017.

(Continued)

*Primary Examiner* — Piotr Poltorak
(74) *Attorney, Agent, or Firm* — Patent Law Works LLP

(57) ABSTRACT

The content of each specific image file in a user's backup set (or other type of file set on an endpoint) is analyzed, for example during a backup of the endpoint. Each analyzed image file is categorized based on the results of analyzing its content. The analysis can be in the form identifying one or more objects graphically represented in given image files, and the categorization of image files can be based on these identified graphically represented object(s). Subsequently (for example during a subsequent backup of the endpoint), modifications made to specific ones of the image files in the file set are detected. In response to a quantification of the detected modifications exceeding a specific threshold level, it is adjudicated that a file corruption event has occurred on the endpoint, such as a cryptographic ransomware attack. In response to the adjudication, one or more security actions are taken.

20 Claims, 5 Drawing Sheets

(56) References Cited

U.S. PATENT DOCUMENTS

| | | | |
|---|---|---|---|
| 2011/0078497 A1* | 3/2011 | Lyne | G06F 11/1469 714/15 |
| 2011/0082838 A1* | 4/2011 | Niemela | G06F 11/1458 707/654 |
| 2011/0161364 A1* | 6/2011 | Hwang | G06F 21/56 707/769 |
| 2013/0024467 A1* | 1/2013 | Miller | G06Q 10/101 707/756 |
| 2013/0159768 A1* | 6/2013 | McKay | G06F 11/1448 714/19 |
| 2013/0318610 A1* | 11/2013 | Zaitsev | G06F 21/56 726/24 |
| 2017/0091453 A1* | 3/2017 | Cochin | G06F 21/565 |
| 2017/0140156 A1* | 5/2017 | Gu | G06F 11/1451 |
| 2017/0331772 A1* | 11/2017 | Stillabower | H04L 29/06 |
| 2018/0060591 A1* | 3/2018 | Dobrila | G06F 21/56 |

OTHER PUBLICATIONS

Kishore, Aseem, "How to Hide files in JPEG Pictures", https://www.online-tech-tips.com/computer-tips/hide-file-in-picture/, Apr. 16, 2008.

Google Search, https://www.google.com/intl/es419/insidesearch/features/images/searchbyimage.html, site visited Aug. 2017.

* cited by examiner

USING RECOGNIZED BACKUP IMAGES FOR RECOVERY AFTER A RANSOMWARE ATTACK

TECHNICAL FIELD

This disclosure pertains generally to computer backup and to computer security, and more specifically to using recognized backup images for recovery after a ransomware attack.

BACKGROUND

Ransomware is a type of malware that encrypts a victim's files, and demands electronic payment of a ransom in order to provide a decryption key. Ransomware often targets specific files which tend to be the most import to users and the most difficult to recreate, such as user created documents, photographs, videos, etc. The encryption used in ransomware attacks has become very sophisticated, and there is typically no practicable way of decrypting a user's files without the decryption key.

Backup solutions automatically backup files from the computers of users and organizations to the cloud. Thus, if a backup system is installed on a computer and a current, clean backup exists of the files that were encrypted by a ransomware attack, the backup can be used for recovery. However, once the ransomware encrypts the user's files, conventional backups from that point on will be encrypted. A backup from an earlier recovery point prior to the attack can be used, but depending upon how often backups are created, a substantial amount of content could be lost. For example, if backups are made weekly on Sundays, an attack on Saturday will destroy six days of content.

It would be desirable to address these issues.

SUMMARY

The content of each specific image file in a user's backup set (or other type of file set on an endpoint) is analyzed, for example during a backup of the endpoint to a server or the like. Each analyzed image file is categorized based on the results of analyzing its content. The analysis can be in the form identifying one or more objects graphically represented in given image files, and the categorization of image files can be based on these identified graphically represented object(s). For example, graphical representation(s) of person(s) can be identified, either generally or at the level of specific individuals. In one embodiment, automatic computerized facial recognition is utilized to identify a specific person depicted by an identified graphical representation in an image file. Other examples of objects that can be identified in image file content are graphical representations of specific places (e.g., Yellowstone National Park, New York City) or types of places (e.g., beaches, forests,) specific events (e.g., a specific graduation or wedding) or types of events (e.g., baseball games, concerts), specific animals (e.g., a specific pet dog or cat) or types of animals (e.g., cats, chickens, horses), and specific inanimate objects (e.g., a specific car or bicycle) or types of inanimate objects (e.g., airplanes, houses). Another example of an object that can be identified in the content of an image file is the graphical representation of text. The categorization of image files based on objects identified in their content can be at any level of granularity, and can be based on individual identified objects or combinations thereof. The categorization can be supplemented by additional factors such as the location at which an image file was created (e.g., GPS coordinates at which a digital photo was taken), the identifier of the device on which the image file was created (e.g., the id of the phone or digital camera), and/or the source of the image file external to the endpoint (e.g., the Internet, a USB stick). Categorization metadata concerning each specific one of the image files in the file set is maintained. The categorization metadata concerning a specific image file describes its categorization based on the results of analyzing its content.

Subsequently (for example during a subsequent backup of the endpoint), modifications made to specific ones of the image files in the file set are detected. This detection can take the form of reanalyzing the content of each specific image file in the file set, and recategorizing each specific image file, based on the results of reanalyzing its content. The results of the recategorizing are compared to the maintained categorization metadata, and modifications made to specific ones of the image files are thus detected. The degree of the detected modifications can be quantified, for example by weighting different types of modifications and/or degrees of change, according to individual modified image files and/or across all modified image files.

In response to the quantification of the detected modifications exceeding a specific threshold level, it is adjudicated that a file corruption event has occurred on the endpoint, such as a cryptographic ransomware attack. In response to the adjudication, one or more security actions are taken. In one embodiment, the categorization metadata is used to identify when the endpoint was compromised by the file corruption event, and all files of the file set (not just the image files) are automatically recovered, using the most recent backed-up version from prior to the file corruption event. Other security actions are also possible, such as pausing or terminating the current backup of the endpoint, notifying a user of the adjudication of the occurrence of the file corruption event, directing the user to start a file recovery from a previous version, or transmitting a notification of the adjudication of the occurrence of the file corruption event to an external security server.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
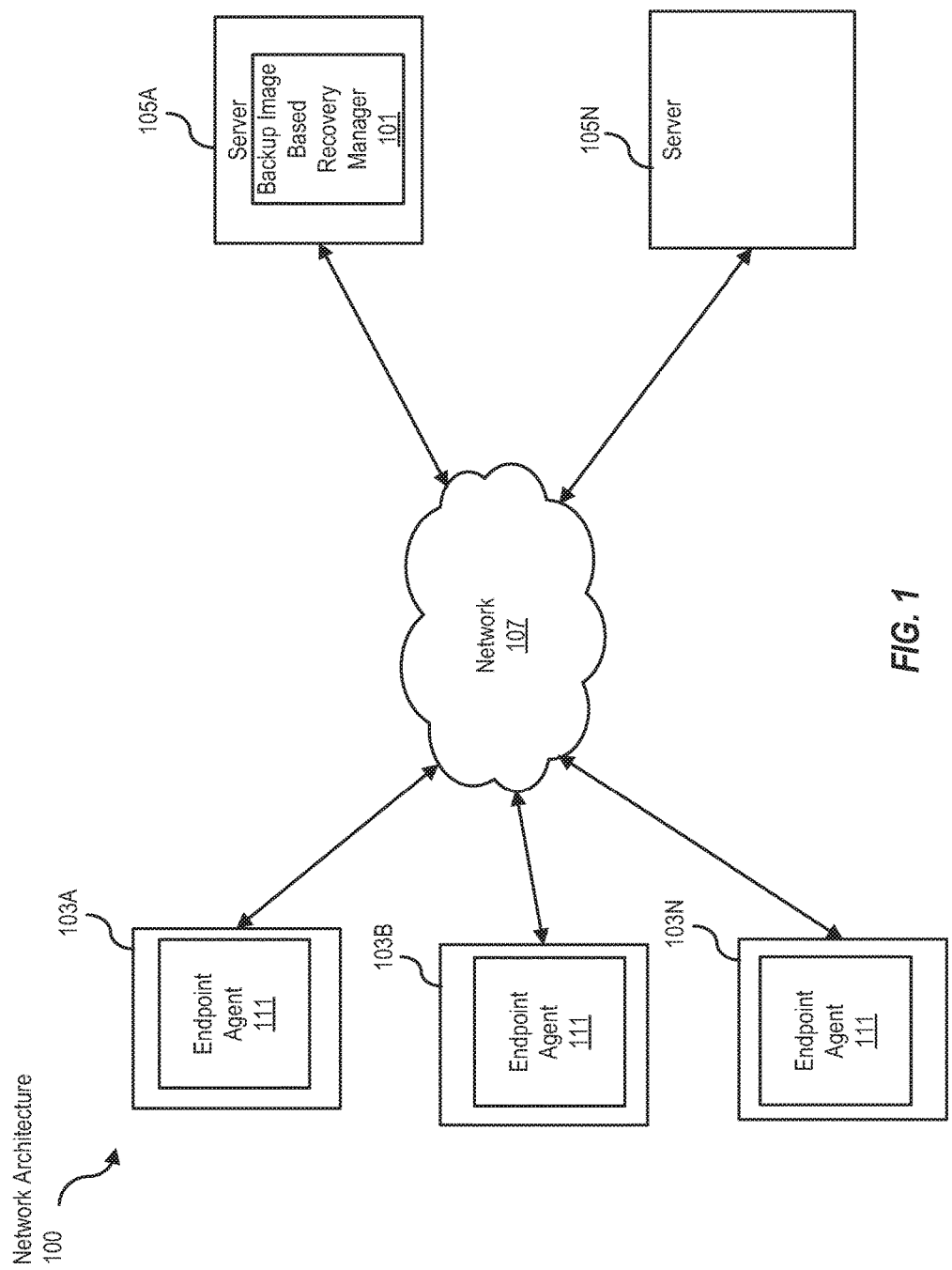
FIG. 1 is a block diagram of an exemplary network architecture in which a backup image based recovery manager can be implemented, according to some embodiments.

FIG. 1 is a block diagram illustrating an exemplary network architecture 100 in which a backup image based recovery manager 101 can be implemented. The illustrated network architecture 100 comprises multiple clients 103A, 103B and 103N, as well as multiple servers 105A and 105N. In FIG. 1, a backup image based recovery manager 101 is illustrated as residing on server 105A, with an endpoint agent 111 residing on each client 103A-C. It is to be understood that this is an example only, and in various embodiments various functionalities of this system 101 can be instantiated on a client 103, a server 105, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can be in the form of desktop/laptop computers, or mobile computing devices, comprising portable computer systems capable of connecting to a network 107 and running applications (e.g., smartphones, tablet computers, wearable computing devices, etc.).

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
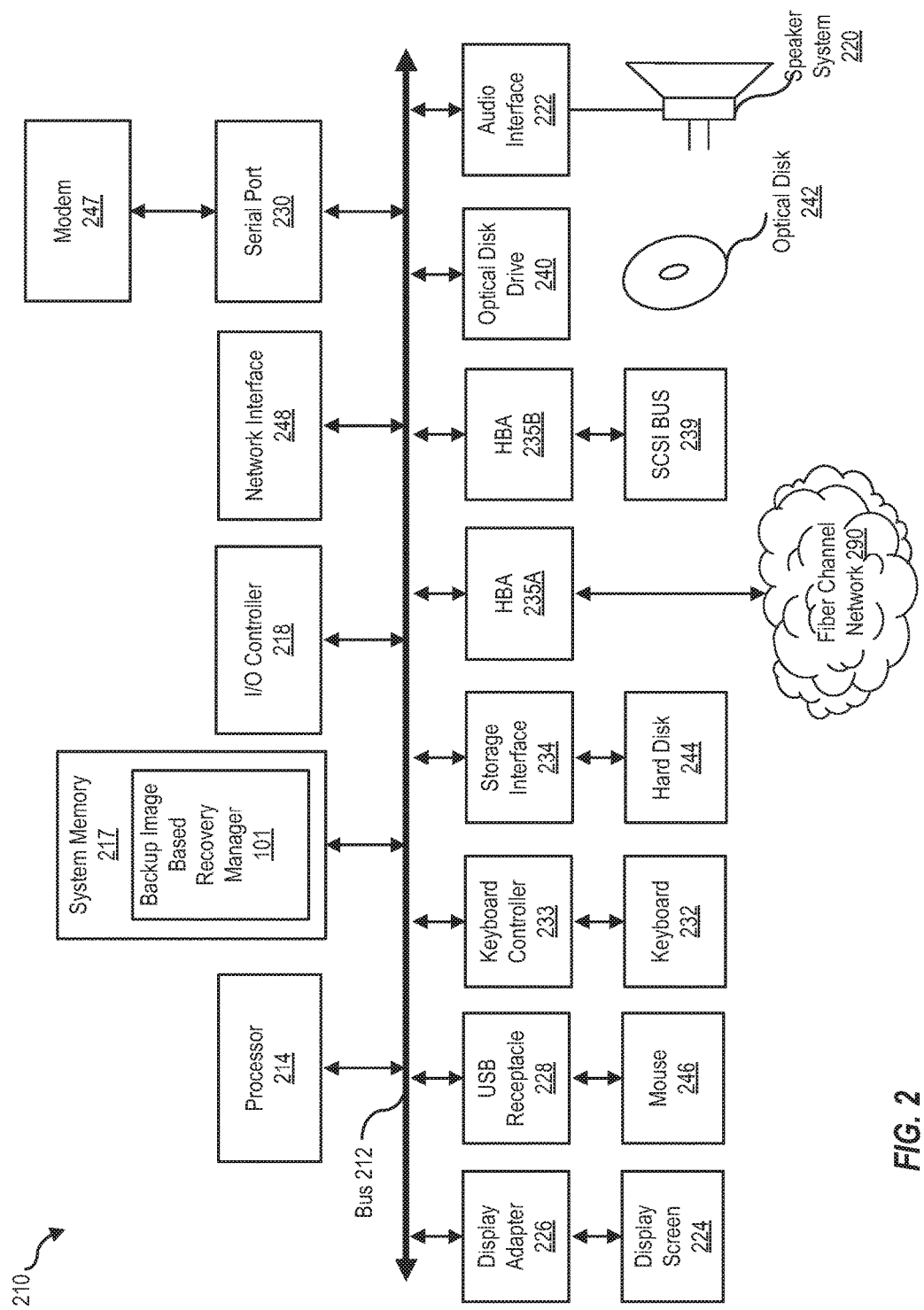
FIG. 2 is a block diagram of a computer system suitable for implementing a backup image based recovery manager, according to some embodiments.

FIG. 2 is a block diagram of a computer system 210 suitable for implementing a backup image based recovery manager 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker 220, a display adapter 226 communicatively coupled to an external video output device such as a display screen 224, one or more interfaces such as Universal Serial Bus (USB) ports 228, serial ports 230, etc., a keyboard controller 233 communicatively coupled to a keyboard 232, a storage interface 234 communicatively coupled to at least one hard disk 244 (or other form(s) of magnetic media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB ports 228). The various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the backup image based recovery manager 101 is illustrated as residing in system memory 217. The workings of the backup image based recovery manager 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
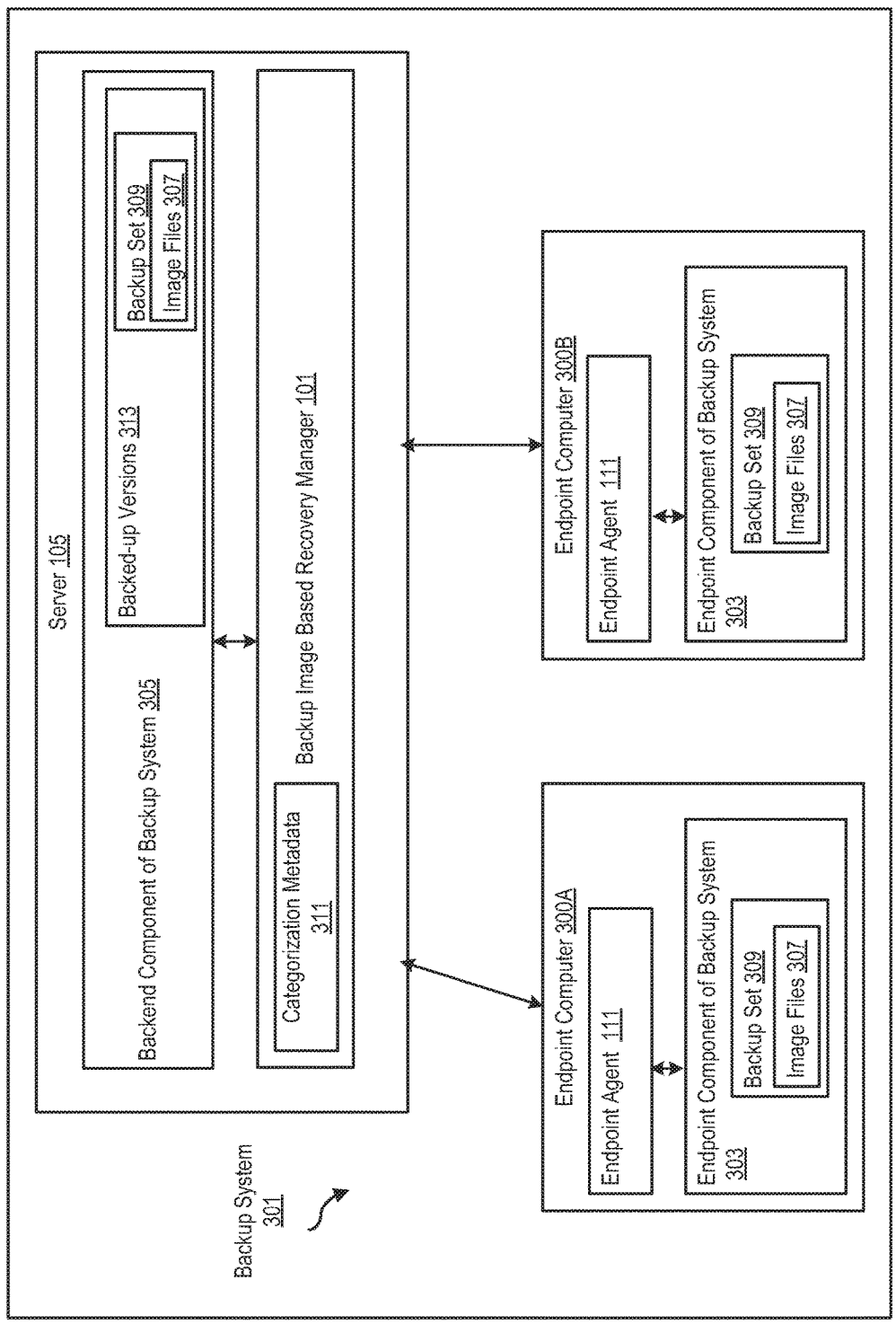
FIG. 3 is a high level block diagram of the operation of a backup image based recovery manager, according to some embodiments.

FIG. 3 illustrates the operation of a backup image based recovery manager 101 running on a server 105 and communicating through a network 107 (e.g., the Internet) with multiple endpoint agents 111. As described above, the functionalities of the backup image based recovery manager 101 can reside on specific computers 210 or be otherwise distributed between multiple computer systems 210, including within a fabric/cloud-based computing environment in which the functionality of the backup image based recovery manager 101 is provided as a service over a network 107.

As illustrated in FIG. 3, the backup image based recovery manager 101 runs in conjunction with a backend (e.g., server side, cloud based) component 305 of a backup system 301, whereas the endpoint agents 111 run in conjunction with endpoint (e.g., client side) components 303 of a backup system 301. In FIG. 3, the backup image based recovery manager 101 and endpoint agents 111 are depicted as separate entities that are communicatively coupled with the backend component 305 and endpoint component 303 of the backup system 301. It is to be understood that in some embodiments, the backup image based recovery manager 101 and/or endpoint agents 111 can be instantiated as components of the backup system 301. The backend component 305 of the backup system 301 and the backup image based recovery manager 101 are illustrated as residing on the same server 105, although the functionalities associated with one or both of these components can be distributed across multiple computers 210 at a single or multiple locations as desired.

The centralized backend component 305 of the backup system 301 communicates with endpoint computers 300 on which the endpoint level components 303 of the backup system 301 are installed. These endpoints 300 are the computer systems 210 of the customers of the backup system 301 vendor. Although FIG. 3 only depicts two endpoint computers 300A and 300B for clarity of illustration, it is to be understood that in practice the centralized backend component 305 of the backup system 301 can communicate with orders of magnitude more endpoints 300 (e.g., dozens, hundreds, thousands, tens of thousands, etc.), depending on the size of the installed customer base.

The backup image based recovery manager 101 enables file recovery after a ransomware or other cryptographic attack based on analysis of a user's backup image files 307. As illustrated in FIG. 3, during the process of backing-up from endpoint 300A to the backend server 105, the backup image based recovery manager 101 analyzes the image files 307 in the backup set 309, and categorizes each image file 307 according to its content. As used herein, the term "backup set 309" refers to a set of files, folders and/or other resources designated for backup on a specific endpoint 300. The files in a backup set 309 can be, for example, automatically backed-up according to a schedule (e.g., daily. weekly, monthly, etc.). As used herein, the term "image file 307" refers to a stored digital image or representation of graphical information, in a format that can be rasterized for display on a screen, printer or similar output device. Once rasterized, the image becomes a grid of pixels. An image file 307 may be stored in any uncompressed, compressed or vector format. Examples of image file formats are JPEG, Exif, TIFF, GIF, BMP, PNG, PSD, CGM, SVG, etc.

The content-based categorization of image files 307 is described in detail below, and can be at any desired level of granularity. For example, specific image files 307 can be categorized as containing imagery of people, places, things, events, animals, etc. The content based categorization of image files 307 can also be supplemented with additional information describing the image files 307, such as identifiers of devices used to create image files 307, sources from which image files 307 were obtained, GPS coordinates of locations at which photographs were taken, etc. The categorization information concerning the image files 307 is stored as metadata 311 on the backend.

During a subsequent backup of the endpoint 300A, the image files 307 in the corresponding backup set 309 are checked against the corresponding stored categorization metadata 311. If the differences are above a given threshold, the endpoint computer 300A is adjudicated to having been subject to a file corrupting event such as a ransomware or other type of cryptographic attack, and a corresponding security action can be taken in response. For example, the backup can be terminated, the point at which the endpoint 300A was attacked can be determined, and a pre-attack backup of all the user's files (not just the image files 307) can be used to recover the user's data that was encrypted by the ransomware attack.

It is to be understood that some conventional defenses against ransomware check to determine whether image files 307 in the backup set 309 have been converted to non-images, which is what one would expect from encryption. To avoid detection by such a check, modern ransomware frequently replaces the user's image files 307 with image files 307 containing a graphic representation of text demanding payment of the ransom or something similar. This ransomware evasion technique prevents detection with a conventional check to determine whether images have been replaced with non-images, but is detected but the use of the backup image based recovery manager 101 as described herein.

Some legitimate changing of image files 307 by the user is to be expected (e.g., zooming, cropping and other editing of digital photographs and the like). By contrast, major changes such as replacement of pictures with graphical images of text are a cause of suspicion, especially when this occurs across all or many of the image files 307 in a given backup set 309. Thus, the amount of change that occurred to the image files 307 in the backup set 309 is quantified. Where a given threshold level is exceeded, a cryptographic attack may be suspected. The specific threshold level used to trigger adjudication of an attack is a variable design parameter that can be adjusted between embodiments and under different circumstances as desired.

Figure 4:
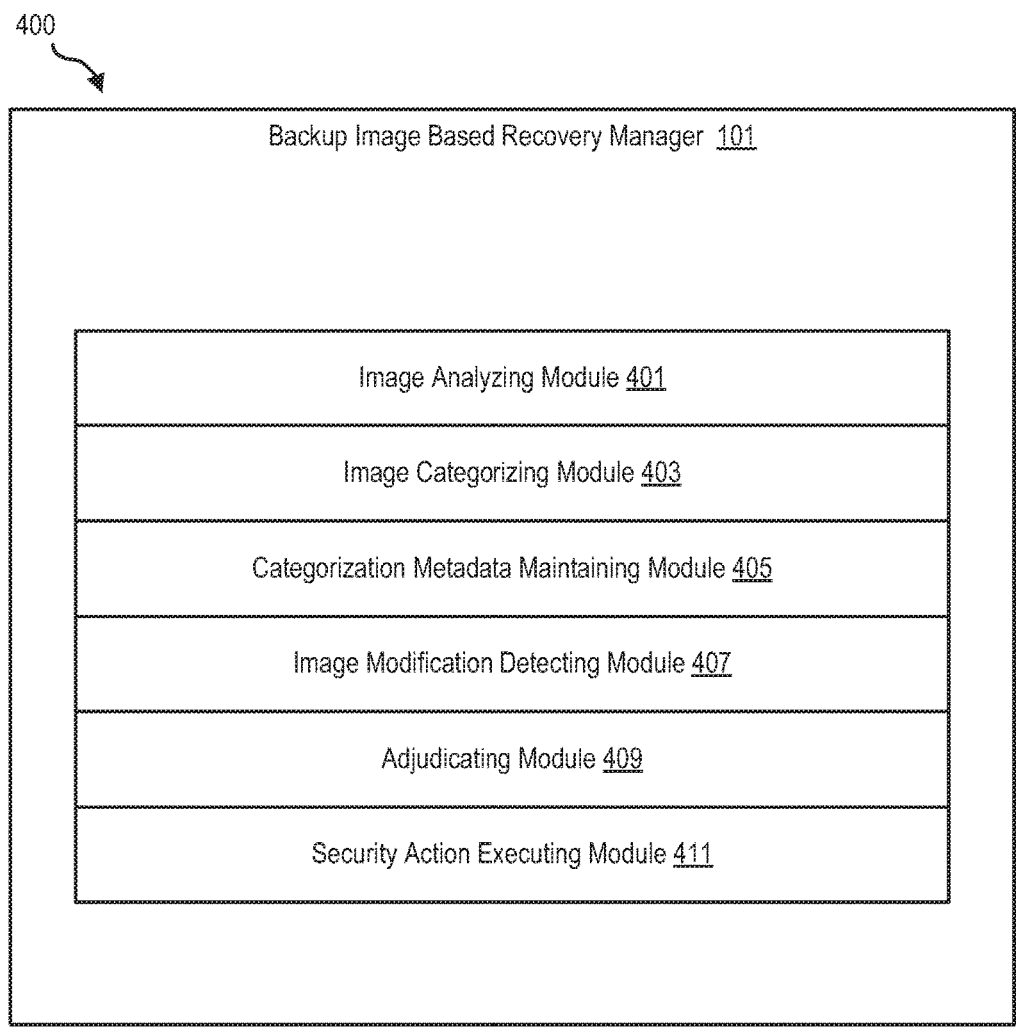
FIG. 4 is a block diagram of a backup image based recovery manager, according to some embodiments.

FIG. 4 illustrates a specific multiple module instantiation of a backup image based recovery manager 101, according to one embodiment. It is to be understood that although the backup image based recovery manager 101 is illustrated as a single entity, the illustrated backup image based recovery manager 101 represents a collection of functionalities, which can be instantiated as a single or multiple modules as desired. It is to be understood that the modules of the backup image based recovery manager 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the backup image based recovery manager 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

Figure 5:
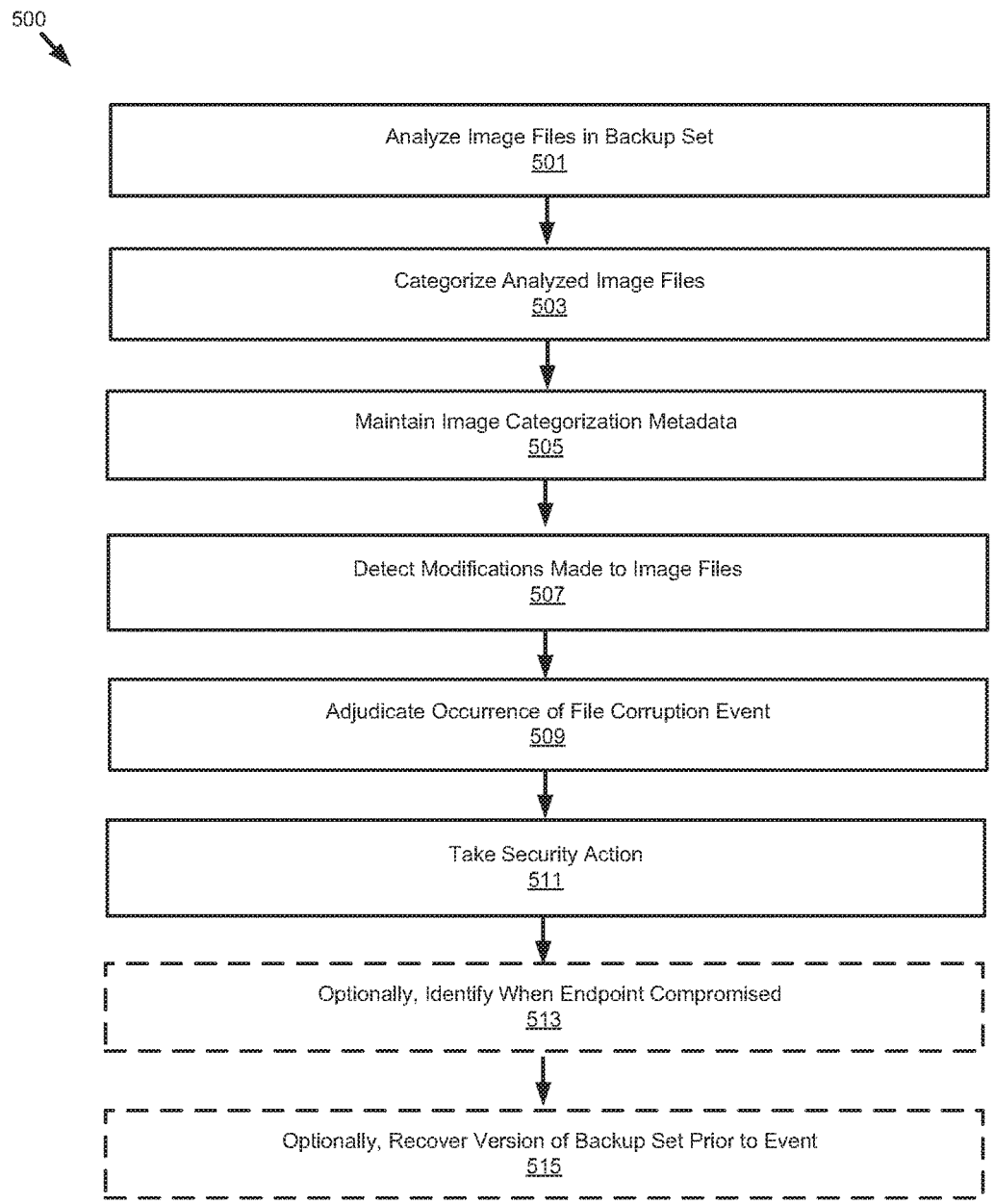
FIG. 5 is a flowchart illustrating steps performed by a backup image based recovery manager, according to some embodiments.

FIG. 5 illustrates steps 500 executed by the backup image based recovery manager 101, according to some embodiments. For clarity of description, the subject matter illustrated in FIGS. 4 and 5 is described together below.

During a backup of an endpoint 300 to the server 105, an image analyzing module 401 of the backup image based recovery manager 101 analyzes 501 all of the image files 307 in the backup set 309. The analysis of image files 307 can take the form of identifying specific objects represented in the content of image files 307. The identified objects are used to categorize the corresponding image file 307, as described in more detail below. Different objects and types of objects in the image files 307 are identified in different embodiments. For example, in one embodiment graphical representations of people are identified, e.g., by using facial recognition. Facial recognition algorithms and techniques are known to those of ordinary skill in the relevant art, and the implementation mechanics of their use within the context of the backup image based recovery manager 101 will be readily apparent to those of such a skill level in light of this specification. In one embodiment, once a given image is determined to contain one or more people, the individuals can be identified more specifically, for example by gleaning the information from the user's social network(s) or an external database of known faces, or by prompting the users to identify people in specific images, etc. In another embodiment, image files 307 are identified as containing people generically but no attempt is made to identify specific individuals.

Identifying image files 307 containing people as well as further identifying specific people in the images are just examples for the type of information concerning image file content that the image analyzing module 401 can determine. In some embodiments the image analyzing module 401 can identify graphical representations of specific places in image files 307, such as specific national parks, landmarks, tourist destinations, museums, etc., for example using public or proprietary image databases. Specific types of scenery (e.g., beaches, mountains, cliffs, cities, rivers, etc.) can also be identified. Another example is specific events or types of events, such as sporting events, concerts, graduations, weddings, etc. Various specific instances or types of domestic, farm and wild animals can be identified in image files 307, as can different inanimate objects such as cars, vans, trucks, airplanes, boats, houses, street signs, etc. Another example of an object that can be identified in the content of an image file 307 is the graphical representation of text. It is to be understood that these are just non-exhaustive examples of objects (and types of objects) that can be identified in image files 307.

An image categorizing module 403 of the backup image based recovery manager 101 categorizes 503 each analyzed image file 307 in the backup set 309, based on the above-described analysis. In other words, the image files 307 can be categorized based on their content as determined via the analysis. This categorization can be at any level of granularity as desired (e.g., a specific image file 307 can be categorized as containing images of people generally, a specific number of people, specific people, etc.). Each image file 307 can be categorized according to multiple separate categories depending upon the various objects and such identified in the given embodiment (e.g., a specific image file 307 can be categorized as containing images of a specific person, at a specific national park, as well as redwood trees, a bear, an RV, etc.).

In some embodiments, the above-described object recognition based categorization can be supplemented by additional information concerning image files 307 gleaned during the analysis, such as location (e.g., GPS coordinate) of where a photograph was taken, an identifier of the device with which it was taken (e.g., specific make and/or model of digital camera/phone), the source of the image file (e.g., was it downloaded from Internet or copied from an SD card?), etc. Further categorizing image files 307 according to such additional information refines the level of precision of the categorization.

A categorization metadata maintaining module 405 of the backup image based recovery manager 101 maintains 505 image categorization metadata 311 concerning the image files 307 in the user's backup set 309. More specifically, as image files 307 are analyzed and categorized based on content and other factors as described above, the resulting information describing the categorization of the various image files 307 is stored and maintained as categorization metadata 311 on the server-side. The categorization metadata 311 concerning the image files 307 in a user's backup set 309 can be stored with the corresponding backups, and/or independently on the backend as desired. Note that although FIG. 3 illustrates the categorization metadata 311 being maintained on the same server 105 as the backend component 305 backup system 301, this is just an example, and the categorization metadata 311 can be maintained anywhere in the cloud as desired.

During a subsequent backup of the backup set 309 from the endpoint 300, an image modification detecting module 407 of the backup image based recovery manager 101 detects 507 modifications made to the image files 307 since the images files 307 were previously analyzed and categorized. More specifically, during subsequent backups the image files 307 in the backup set 309 can be reanalyzed and recategorized using the techniques described above, and their current categorizations can be compared to the corresponding stored categorization metadata 311 describing those image files 307. This enables the image modification detecting module 407 to detect changes to the image files 307.

Changes can be detected at the level of individual image files 307. For example, suppose the stored categorization metadata 311 pertaining to a specific image file 307 indicates that the image depicts, e.g., three specific people, whereas during the subsequent backup the categorization of the specific image file 307 does not match. The level of detected change could be more or less extreme depending upon the contents of the given image file 307 at the time of the subsequent backup. For example, the subsequent categorization could indicate that the image file 307 now contains a graphic depiction of text (very different), two of the original three specific people (moderately different) or three people two of whom are unchanged, and one of whom cannot be identified (somewhat less different), etc. Changes can also be detected across multiple images (e.g., 95% of the image files have changed, 30% of the image files have changed, 2% have changed, etc.). Generally, a certain amount of modification is to be expected, as users make certain edits to photographs and other types of image files 307, such as cropping, zooming, resizing, adjusting colors, etc. However, substantial changes, especially when made a cross a large percentage of the image files 307 in the backup set 309, can trigger suspicion.

The image modification detecting module 407 can quantify the degree of detected change, by weighting different types of modifications and/or degrees of change (at any desired level of granularity), at the level of individual image files 307 and/or across the image files 307 of the backup set 309. Where the quantification of the detected changes exceeds a given threshold level, then in response an adjudicating module 409 of the backup image based recovery manager 101 can adjudicate 509 that a cryptographic attack (or in some embodiments other form of file corrupting event) has occurred on the endpoint 300. It is to be understood that the specific value of use for the threshold is a variable design parameter that can be adjusted up or down as desired.

In response to adjudicating the occurrence of a cryptographic attack, a security action executing module 411 of the backup image based recovery manager 101 can take 511 a security action. Different security actions can be taken in different embodiments. For example, the current backup process can be paused or terminated (to avoid backing-up encrypted files), the user can be notified and/or directed to recover his/her files from a previous version 313 of the backup, a notification concerning the suspected attack can be transmitted to an external security server (not illustrated), etc.

In one embodiment, the security action executing module 411 uses the categorization metadata 311 on the backed to identify 513 when the endpoint 300 was first compromised by the corruption event/attack, and then automatically recovers 515 all of the files of the backup set 309 (not just the image files 307), using the most recent backed-up version 313 from prior to the attack/corruption event (or prompts the user to initiate such a recovery operation). More specifically, successive prior backed-up versions 313 of one or more image files 307 detected as having been changed can be analyzed, categorized and compared to the corresponding categorization metadata 311, until a version 313 is identified in which the image file(s) 307 being analyzed have not been modified to a degree in excess of a given threshold (e.g., the categorization of the given version 313 of the image files 307 matches the corresponding categorization metadata 311 within the threshold margin). Once the point of corruption is established, the all of the files (not just the image files 307) are recovered from the last backed-up version 313 of the backup set 309 prior to that point.

Backup systems 301 typically store only a limited number of versions 313 of backups of any given backup set 309. Storage space is finite and has a cost, and backups lose their relevance as they become older. Thus, in one embodiment, when the backup system 301 purges old backed-up versions 313 of the backup set 309, the backup image based recovery manager 101 enforces that at least one version 313 of the backup set 309 with image files 307 that match the corresponding categorization metadata 311 within the margin of the threshold is maintained. In other words, as old versions 313 of backed-up files are purged over time, it is ensured that at least one uncorrupted pre-attack backed-up version 313 of the backup set 309 is maintained.

In other embodiments, the backup image based recovery manager 101 uses the above-described functionality to detect and recover from types of data loss/file corruption events other than those caused by a cryptographic attack, for example data loss or corruption resulting from application or operating system level bugs or problematic configurations, hardware failure, etc. For example, the backup image based recovery manager 101 functionality could be used to identify the failure or corruption of a hard disk or other storage mechanism, automatically identify the most recent restoration point prior to the data corruption, and automatically recover to that point. Furthermore, this functionality can be applied in contexts other than backups of an endpoint 300, such as periodic analysis, categorization and modification detection of the image files 307 in an endpoint file set such as the/Pictures folder in Windows, the user's home directory in Linux, etc.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method comprising:
analyzing, by a computing device, content of each specific one of a plurality of image files in a set of files on an endpoint;
for each specific image file of the plurality of image files in the file set, categorizing, by the computing device, the specific image file, based on results of analyzing its content;
storing, by the computing device, categorization metadata concerning each specific one of the plurality of image files in the file set, wherein categorization metadata concerning a specific image file describes its categorization based on results of analyzing its content;
subsequently reanalyzing and recategorizing image files;
comparing reanalyzed categorization metadata to corresponding stored categorization metadata;
quantifying a degree of detected change by weighting different types of modification and/or degrees of change; and
in response to the degree exceeding a specific threshold level, adjudicating, by the computing device, that a file corruption event has occurred on the endpoint; and
taking a security action, by the computing device, in response to adjudicating that the file corruption event has occurred on the endpoint.

2. The method of claim 1 further comprising:
analyzing, by the computing device, the content of each specific one of the plurality of image files in the file set of the endpoint, during a first backup of the endpoint;
categorizing, by the computing device, each specific one of the plurality of image files in the file set, during the first backup of the endpoint; and
subsequently detecting, by the computing device, modifications made to specific ones of the image files of the plurality of image files in the file set, during a subsequent backup of the endpoint;
wherein the file set of the endpoint comprises a backup set.

3. The method of claim 1 further wherein:
analyzing content of an image file further comprises identifying at least one object graphically represented therein; and
categorizing an image file is further based on the at least one identified graphically represented object.

4. The method of claim 1 further wherein:
analyzing content of an image file further comprises identifying multiple graphically represented objects therein; and
categorizing an image file is further based on a combination of identified graphically represented objects.

5. The method of claim 1 wherein:
analyzing content of an image file further comprises identifying at least one graphical representation of a person.

6. The method of claim 5 wherein identifying at least one graphical representation of a person further comprises:
utilizing, by the computing device, automatic computerized facial recognition to identify a specific person depicted by an identified graphical representation in an image file.

7. The method of claim 1 wherein:
analyzing content of an image file further comprises identifying at least one graphical representation of a specific place or of a type of place.

8. The method of claim 1 wherein:
analyzing content of an image file further comprises identifying at least one graphical representation of a specific event or of a type of event.

9. The method of claim 1 wherein:
analyzing content of an image file further comprises identifying at least one graphical representation of a specific animal or of a type of animal.

10. The method of claim 1 wherein:
analyzing content of an image file further comprises identifying at least one graphical representation of a specific inanimate object or of a type of inanimate object.

11. The method of claim 1 wherein:
analyzing content of an image file further comprises identifying a graphical representation of text.

12. The method of claim 1 wherein:
categorizing an image file is further based on at least one factor from a group of factors consisting of: a location of image file creation, an identifier of a device on which an image file was created and a source of an image file external to the endpoint.

13. The method of claim 1 further comprising:
reanalyzing, by the computing device, content of each specific one of the plurality of image files in the file set; and
for each specific image file of the plurality of image files in the file set, recategorizing, by the computing device, the specific image file, based on results of reanalyzing its content; and
detecting, by the computing device, modifications made to specific ones of the image files of the plurality of image files in response to comparing results of the recategorizing to the maintained categorization metadata.

14. The method of claim 1 wherein quantifying a degree of detected change by weighting different types of modification and/or degrees of change further comprises:
quantifying, by the computing device, a degree of the detected modifications made to specific ones of the image files of the plurality of image files, by weighting different types of modifications and/or degrees of change, according to individual modified image files.

15. The method of claim 1 wherein quantifying a degree of detected change by weighting different types of modification and/or degrees of change further comprises:
quantifying, by the computing device, a degree of the detected modifications made to specific ones of the image files of the plurality of image files, by weighting different types of modifications and/or degrees of change, according to all modified image files.

16. The method of claim 1 wherein adjudicating, by the computing device, that a file corruption event has occurred on the endpoint further comprises:
adjudicating, by the computing device, that a cryptographic ransomware attack has occurred.

17. The method of claim 1 wherein taking a security action, by the computing device, in response to adjudicating that the file corruption event has occurred on the endpoint further comprises:
taking, by the computing device, at least one security action from a group of security actions consisting of: pausing a current backup of the endpoint, terminating a current backup of the endpoint, notifying a user of the adjudication of the occurrence of the file corruption event, directing a user to start a file recovery from a previous version, and transmitting a notification of the adjudication of the occurrence of the file corruption event to an external security server.

18. The method of claim 1 wherein taking a security action, by the computing device, in response to adjudicating that the file corruption event has occurred on the endpoint further comprises:
using categorization metadata to identify when the endpoint was compromised by the file corruption event; and
automatically recovering all files of the file set, using a most recent backed-up version from prior to the file corruption event.

19. At least one non-transitory computer readable-storage medium storing computer executable instructions that, when loaded into computer memory and executed by at least one processor of a computing device, cause the computing device to execute the following steps:
analyzing, by a computing device, content of each specific one of a plurality of image files in a set of files on an endpoint;
for each specific image file of the plurality of image files in the file set, categorizing, by the computing device, the specific image file, based on results of analyzing its content;
storing, by the computing device, categorization metadata concerning each specific one of the plurality of image files in the file set, wherein categorization metadata concerning a specific image file describes its categorization based on results of analyzing its content;
subsequently reanalyzing and recategorizing image files;
comparing reanalyzed categorization metadata to corresponding stored categorization metadata;
quantifying a degree of detected change by weighting different types of modification and/or degrees of change; and
in response to the degree exceeding a specific threshold level, adjudicating, by the computing device, that a file corruption event has occurred on the endpoint; and
taking a security action, by the computing device, in response to adjudicating that the file corruption event has occurred on the endpoint.

20. A computer system comprising:
system memory;
an image analyzing module residing in the system memory, the image analyzing module being programmed to analyze content of each specific one of a plurality of image files in a set of files on an endpoint;
an image categorizing module residing in the system memory, the image categorizing module being programmed to, for each specific image file of the plurality of image files in the file set, categorize the specific image file, based on results of analyzing its content;
a categorization metadata maintaining module residing in the system memory, the categorization metadata maintaining module being programmed to store categorization metadata concerning each specific one of the plurality of image files in the file set, wherein categorization metadata concerning a specific image file describes its categorization based on results of analyzing its content;
an image modification detecting module residing in the system memory, the image modification detecting module being programmed to subsequently reanalyze and recategorize image files, to compare reanalyzed categorization metadata to corresponding stored categorization metadata, and to quantify a degree of detected change by weighting different types of modification and/or degrees of change;

an adjudicating module residing in the system memory, the adjudicating module being programmed to adjudicate that a file corruption event has occurred on the endpoint, in response to the degree exceeding a specific threshold level;

a security action executing module residing in the system memory, the security action executing module being programmed to take a security action, in response to adjudicating that the file corruption event has occurred on the endpoint; and at least one processor configured to execute the modules.

* * * * *